UNITED STATES PATENT OFFICE.

HENRY DREYFUS, OF BASEL, SWITZERLAND.

MANUFACTURE OF ACETIC ACID FROM ACETIC ALDEHYDE.

1,286,256.     Specification of Letters Patent.     Patented Dec. 3, 1918.

No Drawing.     Application filed June 4, 1917. Serial No. 172,794.

*To all whom it may concern:*

Be it known that I, HENRY DREYFUS, of Basel, Switzerland, have invented certain new and useful Improvements in or Relating to the Manufacture of Acetic Acid from Acetic Aldehyde, of which the following is a specification.

In the specification of another application for United States Patent S. No. 172,326 corresponding to my British application for Patent No. 3324 of 1917, I have described and claimed a process for the oxidation of acetaldehyde to produce acetic acid, according to which acetaldehyde mixed with air or oxygen is passed over platinum or other bodies known to act as oxygen carriers in this reaction, at a temperature above the boiling point of acetic acid and below 400° C. and preferably between about 130° and 400° C., the acetic acid formed remaining as vapor and not condensing in the reaction vessel. In the said process it is preferable that the acetaldehyde shall be entrained through the apparatus by the oxygen or air, by passing this through the acetaldehyde so as to vaporize the latter and carry the vapors forward through the reaction apparatus. By subsequent researches, I have now found that, whether with air or with oxygen, there is between the above indicated limits of about 130° to 400° C. a temperature at which the rapidity of the oxidation is greatest and at which, on the other hand, there is complete formation of acetic acid without decomposition to carbonic acid, formic aldehyde and other decomposition products. I have now found that the best temperature is approximately within the limits of 150°–250° C. and preferably between 150° and 200° C. If the conditions of temperature are observed, a very high yield can be obtained. Further, although it might be considered that platinum in a suitable form is the most efficient contact agent, it has been found that some other metals or compounds of metals are more efficient, such for example as copper preferably employed in a form presenting a large surface, such as clippings, parings, or wire gauze, more or less fine, (which may be rolled up for placing in contact tubes) or copper powder.

Compounds of copper may also be employed such as oxid of copper, etc. Chromium compounds are also very efficient, for example, chromium oxid mixed with glass waste or pottery waste, in the form of small pieces. When employing chromium oxid it is preferable to work near the lower temperature limit mentioned, to prevent too strong a reaction. Also other suitable contact agents may be employed, such as oxid of uranium, oxid of vanadium, oxid of cerium, and so forth.

Moreover it has been found that although contact substances facilitate the oxidation of acetic aldehyde to acetic acid it is possible to dispense with them; it suffices to observe the above indicated temperature in order to have a complete oxidation.

To prove this, it is only necessary to take glass tubes filled with any glass scrap, such as small broken tubes or beads, or glass wool, for providing a large surface and a large path, and it will be observed that the oxidation takes place without a contact substance at the temperatures indicated.

For carrying out the reaction one can employ tubes of copper, iron, etc., lined with slabs of acid-resisting stone, or other like material, such tubes being of any suitable length, for example 50 to 100 meters, arranged in a bath of oil heated to 150° to 200° C., or any other form of apparatus, the acetic aldehyde being passed through the apparatus, with or without contact substances in the latter, and being preferably vaporized and entrained by passing through it the current of air serving for the oxidation.

What I claim as my invention, and desire to secure by Letters Patent, is:—

1. A process of making acetic acid, which comprises subjecting a mixture containing acetaldehyde vapor and free oxygen to a temperature between about 150° and 250° C.

2. A process of making acetic acid, which comprises subjecting a mixture containing acetaldehyde vapor and air to a temperature between about 150° and 250° C.

3. A process of making acetic acid, which comprises subjecting a mixture containing acetaldehyde vapor and free oxygen to a temperature between 150° and 200° C.

4. A process of making acetic acid, which comprises subjecting a mixture containing acetaldehyde vapor and air to a temperature between 150° and 200° C.

5. A process of making acetic acid, which comprises passing a mixture containing acetaldehyde vapor and free oxygen in contact with a catalyst at a temperature between about 150° and 250° C.

6. A process of making acetic acid, which comprises passing a mixture containing acetaldehyde vapor and air in contact with a catalyst at a temperature between about 150° and 250° C.

7. A process of making acetic acid, which comprises passing a mixture containing acetaldehyde vapor and free oxygen in contact with a catalyst at a temperature between 150° and 200° C.

8. A process of making acetic acid, which comprises passing a mixture containing acetaldehyde vapor and air in contact with a catalyst at a temperature between 150° and 200° C.

In witness whereof I have hereunto signed my name in the presence of two subscribing witnesses.

HENRY DREYFUS.

Witnesses:
THOMAS LAING WHITEHEAD,
ROBERT MILTON SPEARPOINT.